(12) United States Patent
Fürst et al.

(10) Patent No.: US 9,113,263 B2
(45) Date of Patent: Aug. 18, 2015

(54) VAD DETECTION MICROPHONE AND METHOD OF OPERATING THE SAME

(71) Applicant: Knowles Electronics, LLC, Itasca, IL (US)

(72) Inventors: Claus Erdmann Fürst, Roskilde (DK); Henrik Thomsen, Holte (DK); Michael Deruginsky, Hillerød (DK); Dibyendu Nandy, Naperville, IL (US); Oddy Nopporn Khamharn, Addison, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 14/522,158

(22) Filed: Oct. 23, 2014

(65) Prior Publication Data

US 2015/0043755 A1 Feb. 12, 2015

Related U.S. Application Data

(63) Continuation of application No. 14/282,101, filed on May 20, 2014.

(60) Provisional application No. 61/826,587, filed on May 23, 2013.

(51) Int. Cl.
*H04R 17/02* (2006.01)
*H04R 3/00* (2006.01)
*G10L 15/00* (2013.01)
*H04R 19/00* (2006.01)
*H04R 19/04* (2006.01)

(52) U.S. Cl.
CPC ............... *H04R 17/02* (2013.01); *G10L 15/00* (2013.01); *H04R 3/00* (2013.01); *H04R 19/005* (2013.01); *H04R 19/04* (2013.01)

(58) Field of Classification Search
CPC ........ H04R 3/00; H04R 17/02; H04R 19/005; H04R 19/04; G10L 15/00
USPC ............................ 381/26, 91–95, 111; 700/94
See application file for complete search history.

(56) References Cited

U.S. PATENT DOCUMENTS 6,070,140 A * 5/2000 Tran .............................. 704/275
2006/0233389 A1 * 10/2006 Mao et al. ...................... 381/92

(Continued)

FOREIGN PATENT DOCUMENTS

JP 2001236095 A 8/2001

OTHER PUBLICATIONS

International Search Report and Written Opinion for PCT/US2014/038790, dated Sep. 24, 2014 (9 pages).

*Primary Examiner* — Fan Tsang
*Assistant Examiner* — Eugene Zhao
(74) *Attorney, Agent, or Firm* — Fitch, Even, Tabin & Flannery LLP

(57) ABSTRACT

A microphone includes a microelectromechanical system (MEMS) circuit and an integrated circuit. The MEMS circuit is configured to convert a voice signal into an electrical signal, and the integrated circuit is coupled to the MEMS circuit and is configured to receive the electrical signal. The integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption and the full system operation mode has a second power consumption. The first power consumption is less than the second power consumption. The integrated circuit is configured to generate an interrupt upon the detection of voice activity, and send the interrupt to the host.

19 Claims, 3 Drawing Sheets

(56) References Cited

U.S. PATENT DOCUMENTS

| | | |
|---|---|---|
| 2008/0089536 A1 | 4/2008 | Josefsson |
| 2010/0057474 A1 | 3/2010 | Kong |
| 2011/0208520 A1 | 8/2011 | Lee |
| 2012/0250881 A1 | 10/2012 | Mulligan |
| 2013/0226324 A1* | 8/2013 | Hannuksela et al. ........... 700/94 |
| 2013/0343584 A1* | 12/2013 | Bennett et al. ................ 381/315 |
| 2014/0278435 A1* | 9/2014 | Ganong et al. ................ 704/275 |
| 2015/0049884 A1 | 2/2015 | Ye |

* cited by examiner

VAD DETECTION MICROPHONE AND METHOD OF OPERATING THE SAME

CROSS REFERENCE TO RELATED APPLICATIONS

This application is a continuation of prior U.S. application Ser. No. 14/282,101, entitled "VAD detection Microphone and Method of Operating the Same," filed May 20, 2014, which claims the benefit under 35 U.S.C. §119 (e) to U.S. Provisional Application No. 61/826,587, filed May 23, 2013, the content of both applications is incorporated herein by reference in its entirety.

TECHNICAL FIELD

This application relates to microphones and, more specifically, to voice activity detection (VAD) approaches used with these microphones.

BACKGROUND OF THE INVENTION

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a digital signal process (DSP) will first detect if there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phone and personal computers.

In the use of these approaches, power consumption becomes a concern. Lower power consumption gives longer standby time. For today's smart-phones (in particular), the use of power is a key parameter. Unfortunately, present approaches of operating microphones use and waste much power. This has resulted in user dissatisfaction with these previous approaches and systems.

BRIEF DESCRIPTION OF THE DRAWINGS

For a more complete understanding of the disclosure, reference should be made to the following detailed description and accompanying drawings wherein.

Figure 1:
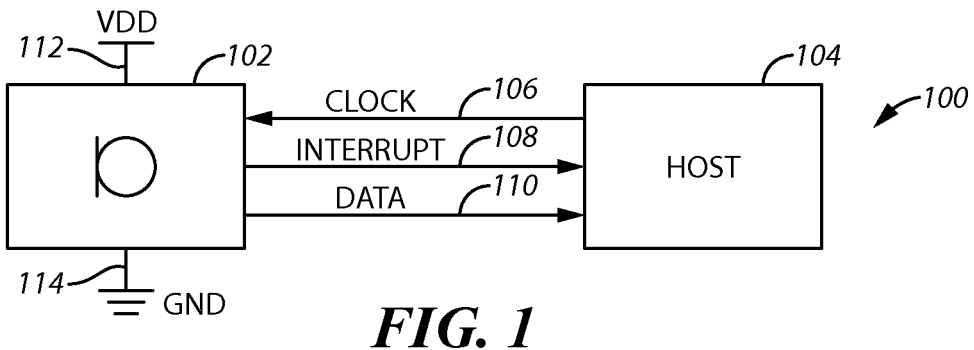
FIG. 1 comprises a block diagram of a system with microphone that uses a VAD algorithm and includes power savings features according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches change the way that present mobile systems are partitioned, the functionality of the microphone, and the modes it can operate in. In these regards, a microphone with a voice or event detection block is presented and this enables the microphone to generate an interrupt signal which can wake the system up.

In some aspects, the microphones described herein include five external connections. The first connection may be a power connection and the second connection may be a ground connection. The third, fourth, and fifth connections are connections from the microphone to a host device (e.g., host circuitry in the device the microphone resides in). More specifically, the third connection may be a data connection, the fourth connection may be an interrupt (sent from the microphone to the host), and the fifth connection may be a clock signal (sent from the host to the microphone).

The microphone may have several modes of operation and these are controlled by a clock signal. The host receives a data signal from the microphone as well as an interrupt signal. The host has multiple power modes controlled by the interrupt signal generated by the microphone. The host generates the clock signal for the microphone and thereby controls the mode of operation of the microphone. In one example, the absence of a clock causes the microphone to enter a voice activity detection mode.

In one example, the microphone includes a VAD (Voice Activity detection) mode of operation. In this mode of operation, the microphone has a very low power consumption, and it runs on a relatively low clock frequency which can be supplied either externally (from the host) or from an on-chip oscillator.

This operation enables very low power consumption levels as only the most necessary signal processing is active during this mode. In one aspect, the analog signal processing blocks of the microphone (such as the microphone preamplifier, the analog to digital converter, the voltage regulators and the charge pump supplying the bias voltage for the MicroElectroMechanicalSystem (MEMS) microphone) operate at lower power. In this mode, these blocks are operated at reduced power enough for achieving the bandwidth and signal to noise ratio (SNR) needed for the VAD or event detector to function. For example, a bandwidth of operation of approximately 8 kHz after decimation and an SNR of approximately 60 dB can be achieved.

The VAD or event detector can be implemented using well known techniques. For example, short term energy measures vs. long term energy measures, zero crossing and so forth can be used to detect voice signals.

It should also be noted that the interface (the connections between the host and the microphone) is not limited to the exact signals described herein. In these regards, other signals or other combinations of signals may be used. The physical implementation of the interface may also vary. For example, it may be a single physical bi-directional line, or multiple uni-directional lines.

In other aspects, the microphone further includes a delay buffer. In other examples, upon wake-up, buffered data is transmitted over a first transmission line and real time data is transmitted simultaneously over a second and separate output lines. In still other examples, buffered data is flushed or discarded upon switching modes.

In still other aspects, the microphone is over-clocked to catch up buffered data to real time data. The microphone can also be used for multi-microphone voice triggered applications. In one example, the microphone wake ups and enables data synchronizations of a second microphone either in a buffered or a real time mode.

Referring now to FIG. 1, a system 100 that uses a microphone 102 having a VAD algorithm and includes power savings features is described. The microphone 102 may be in one example, include MEMS chip (with MEMS die, diaphragm, and charge plate) and an application specific integrated circuit. The system also includes a host 104. The host 104 may include various processing functions and may be part of a device (e.g., a personal computer or cellular phone, mobile handset, or tablet) where the microphone 102 resides.

A VDD power signal 112 and a ground signal 114 are coupled to the microphone 102. An interrupt signal 108 and a data signal 110 are sent from the microphone 102 to the host 104. A clock signal 106 is sent from the host 104 to the microphone 102.

In one example of the operation of the system 100 of FIG. 1, the microphone 102 has several modes of operation and these are controlled by the clock signal 106. The host 104 receives the data signal 110 from the microphone 102 as well as an interrupt signal 108. The host 104 has multiple power modes controlled by the interrupt signal 108 that is generated by the microphone 102 upon the detection of voice activity or a particular voice event (e.g., a specific spoken word). The host 104 generates the clock signal 106 for the microphone 102 and thereby controls the mode of operation of the microphone 102.

In one example, the microphone 102 includes a VAD (Voice Activity detection) mode of operation. In this mode, the microphone 102 has a very low power consumption, and it runs on a relatively low clock frequency which can be supplied either externally (from the clock signal 106 supplied by the host 104) or from an internal on-chip oscillator in the microphone 102. Consequently, when an interrupt is made, the low power operation can be changed to a higher powered mode of operation. As will be recognized, the interrupt allows the system to be operated in both a low power mode of operation and a high power mode of operation.

In some aspects, the integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption or level and the full system operation mode has a second power consumption or level. The first power consumption is less than the second power consumption. The integrated circuit is configured to generate an interrupt upon the detection of voice activity, and send the interrupt to the host. The absence of a clock causes the microphone to enter a voice activity detection mode. The clock circuit may be located on the same chip as the other components or located externally.

In other aspects, the present approaches provide the ability to operate the internal clock at a third power consumption or level and thereafter generate an external data stream and clock to signal the system to operate at a fourth power consumption or level. The third power level is less than the fourth power level, and the fourth power level is less than the first power level.

In still other aspects, the external clock may be detected and this may be applied after the detection of voice activity. Then, the internal clock is synchronized to the external clock. Furthermore, the VAD signal processing is also synchronized to the external clock after synchronization.

In yet other aspects, the system may fall back to the internal clock for power savings at the first or second power level when the external clock is removed to reduce overall system power.

In another example, an external signal may be generated from the internal combination of the clock and the acoustic activity detection that acts as a signal and clock combination to signal the host to interrupt/wakeup and recognize the voice signal. The bandwidth of the input signal after buffering may be in one example approximately 8 kHz. Other examples are possible. Data may be provided in PCM or PDM formats. Other examples of formats are possible.

Figure 2:
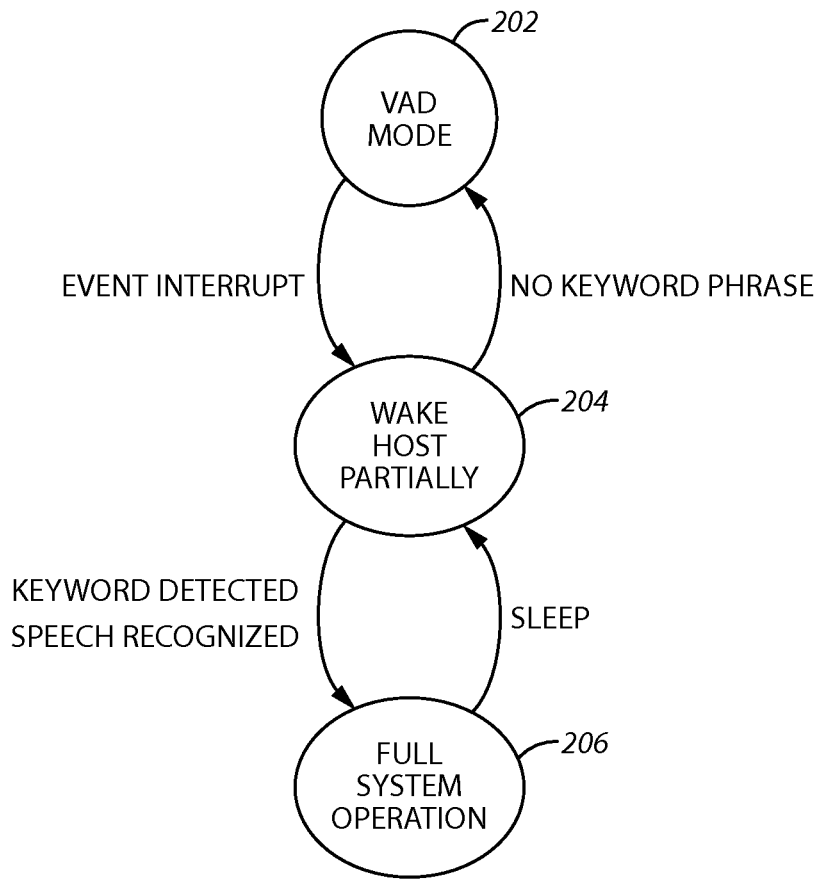
FIG. 2 comprises a flowchart of the various states of a system that uses microphone that uses a VAD algorithm and includes power savings features according to various embodiments of the present invention.

Referring now to FIG. 2, a flowchart of the various operational states of a system that uses microphone that uses a VAD algorithm is described. The approach of FIG. 2 has three modes of operation: a VAD mode 202, a Wake up host (partially) mode 204, and a full system operation mode 206.

In the VAD mode 202, no data is transmitted out of the microphone. The host is sleeping in this mode. In one aspect, when the host is sleeping only the functionality needed to react to a generated interrupt signal from the microphone is enabled. In this mode, the host is clocked at a very low clock to lower power and all unnecessary functionality is powered down. This mode has the absolute lowest power consumption possible as all unnecessary blocks are powered down and no switching of clock or data signals occur. In other words, the mode 202 is a low power mode, where VAD is enabled and no external clock is being received from the host.

In the wake up host (partially) mode 204, the external clock is received from the host. Data is transmitted out of the microphone. The host becomes partially awake due to the detection of a keyword and/or the detection of voice activity. Subsequently, the external clock for microphone is enabled with a clock frequency corresponding to a higher performance level enough for doing reliable keyword detection.

The full system operation mode 206 is the high power or standard operating mode of the microphone.

In one example of the operation of the state transition diagram of FIG. 2, the system begins in mode 202. The VAD algorithm detects an event which will trigger the transition from VAD mode 202 to partially wake up/wake up mode 204.

In the mode 204, the host detects a keyword/speech and decides that a specific key word, phrase, or sentence is recognized. This determination triggers the transition from the mode 204 to the full system wake up 206.

In the mode 206, the host keyword detect/speech recognition algorithm decides that no key word, phrase, or sentence is recognized which triggers the transition back to the VAD mode 202. In this respect, another mode or state (not shown here in FIG. 2) determines that the system should enter partially wake up/wake up mode 204 or go directly to the VAD mode 202.

Figure 3:
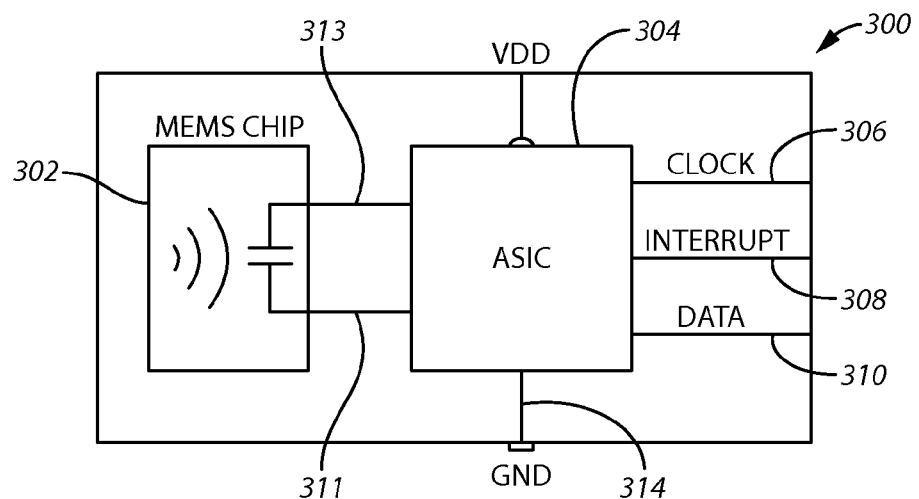
FIG. 3 comprises a block diagram of a microphone that uses a VAD algorithm and includes power savings features according to various embodiments of the present invention.

Referring now to FIG. 3, a microphone 300 that uses a VAD algorithm and includes power savings features is described. The microphone 300 includes a microphone chip or device 302. The microphone chip 302 includes a MEMS die, diaphragm, and charge plate. The system also includes an ASIC 304. The ASIC 304 may include various processing functions. The MEMS chip 302 receives a charge pump signal 315 from the ASIC 304 to power the MEMS chip 302.

A VDD power signal 312 and a ground signal 314 are coupled to the ASIC 304. An interrupt signal 308 and a data signal 310 are received by the ASIC 304 from a host (e.g., the host 104 of FIG. 1). A clock signal 306 is sent from the host is also received by the ASIC 304.

In one example of the operation of the microphone 300 of FIG. 3, the microphone 300 has several modes of operation and these are controlled by the clock signal 306. A voice signal is received by the MEMS chip 302 and this sound is converted into an electrical signal and sent over data lead 311 to the ASIC 304. The ASIC 304 processes the signal into a data signal and then transmits the data signal 310 from the ASIC 304 as well as creating an interrupt signal 308. The host (e.g., the 104 of FIG. 1) generates the clock signal 306 and this controls the mode of operation of the microphone 300.

In one example, the microphone 300 includes a VAD (Voice Activity detection) mode of operation. In this mode, the microphone 300 has a very low power consumption, and it runs on a relatively low clock frequency which can be supplied either externally (from the clock signal 306 supplied by the host) or from an internal on-chip oscillator in the microphone 300. Consequently, when an interrupt is made, the low power operation can be changed to a higher powered operation. The interrupt allows the system to be operated in both a low power mode of operation and a high power mode of operation.

Figure 4:
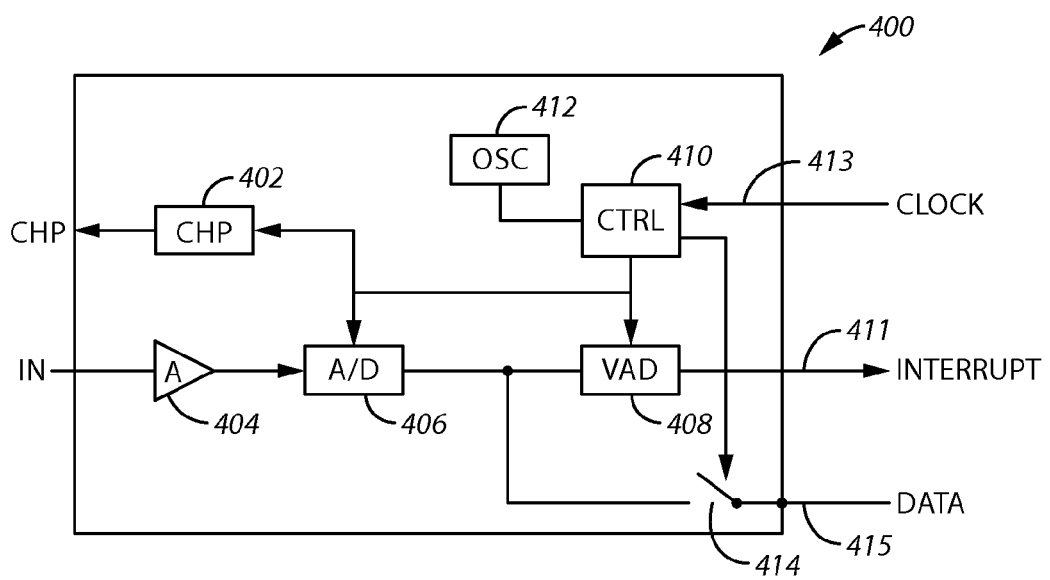
FIG. 4 comprises a block diagram of an application specific integrated circuit (ASIC) according to various embodiments of the present invention.

Referring now FIG. 4, a block diagram of an application specific integrated circuit 400 (ASIC) is described. The ASIC 400 includes a charge pump (CHP) 402, an amplifier 404, an analog-to-digital converter 406, a voice activity detector (VAD) 408, a control block 410 (with oscillator 412), and a switch 414.

The charge pump CHP 402 charges the MEMS element (the MEMS chip 302 if FIG. 3) to convert changes in capacitance to voltage. The amplifier 404 buffers the electrical signal of the MEMS element (the MEMS chip 302 if FIG. 3) and subsequently amplifies the signal with a gain of A.

The A/D converter 406 converts the analog signal from the amplifier 404 to a digital signal. The Voice Activity Detector (VAD) 408 processes the digital signal from the A/D converter 406 and generates an interrupt signal 411 if voice is detected. The control block 410 controls the internal states of the ASIC 400 in a response to an external clock signal 413 (received from a host) and the interrupt signal 411 from the VAD detector 408. The switch 414 is controlled by the control block 410 to allow data 415 to be sent to an external host.

A buffer may be included at the output of the a/d converter 406. The buffer may buffer data representing the audio signal and correspond to or approximate the delay of the VAD 408 (e.g., 10 ms-360 ms to mention one example range with other ranges being possible). A decimation filter stage could be included at the output of the A/D converter in order to reduce buffer size (sampler RAM) and power, this will limit the bandwidth. In this case an interpolation stage at the buffer output must be added as well. In this case, the delay may be around 200 msec. In another example, the delay may be around 360 msec. Other examples of delay values are possible. The buffer is provided to allow any recognition algorithm the latency required to wake-up the host, collect sufficient background noise statistics, and recognize the key phrase within the ambient noise.

The buffered data may be sent to the host via some connection such as the interrupt line 411 or the data line 415. If sending data via the data line 415, it may be sent at an increased clock rate compared to the sampling clock.

Additionally, the parameters or settings of the VAD 408 may be changed or controlled. For example, the reading or writing settings of registers and memory (both erasable and non-erasable) of the VAD 408 may be changed or controlled to, for example, account for various levels of background noise.

The functionality of the VAD 408 may be enhanced or changed. For example, voice or phrase detection may be used. Other functions may also be included.

Figure 5:
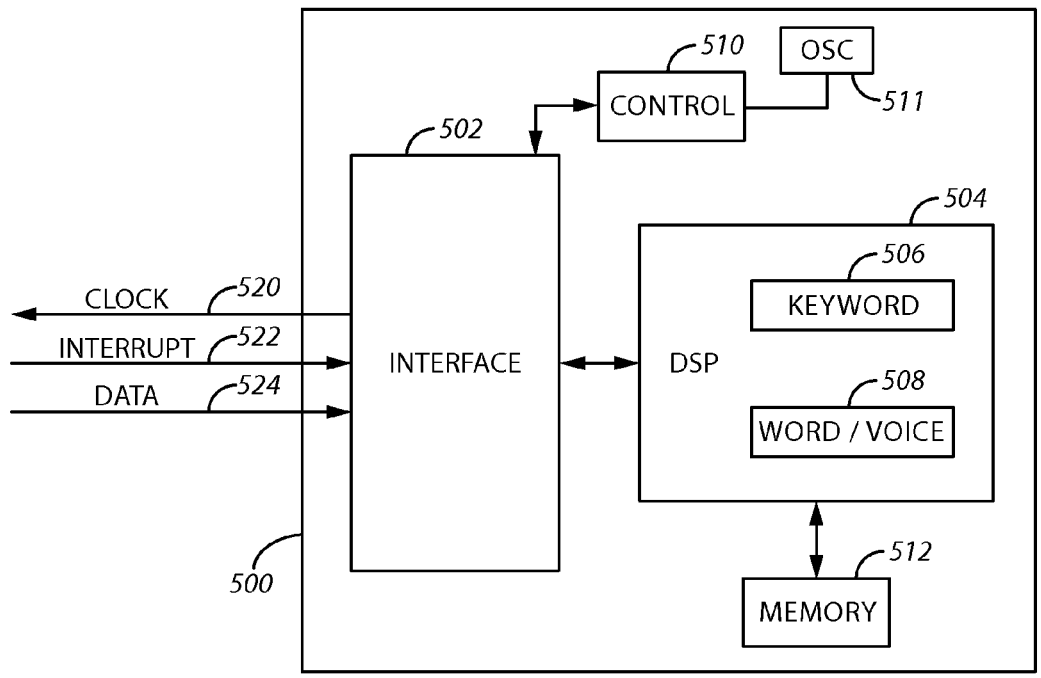
FIG. 5 comprises a block diagram of host according to various embodiments of the present invention.

Referring now FIG. 5, a block diagram of host 500 is described. The host 500 includes an interface block 502, a digital signal processing (DSP) block 504 (including a keyword detection block 506 and word/voice recognition block 508), a control block 510 (clocked by an on-chip oscillator 511), and a memory 512.

The interface block 502 provides interfacing functionality with respect to a microphone (e.g., the microphone 102 in FIG. 1). The interface block transmits the clock signal 520 to the microphone and receives from the microphone an interrupt signal 522 and a data signal 524. The DSP block processes the data signal in two steps using the keyword detection block 506 (detecting a keyword) and the word/voice recognition block 508 (detecting a word or voice).

The control block 510 controls the power states of the microphone (e.g., the microphone 102 of FIG. 1), the blocks of the host 500, and the entire system including other blocks and functions outside the host and microphone (not shown here in FIG. 5).

The memory 512 stores the states of the system, data, and other information. The on chip oscillator 511 is controllable from the control block 510 and enables at least two clock modes corresponding to at least two power modes.

Figure 6:
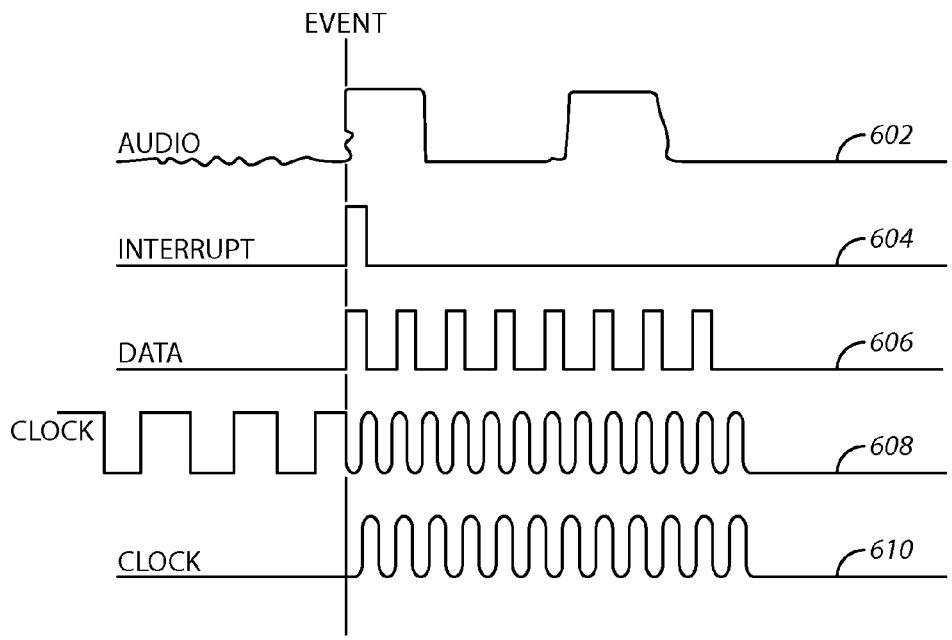
FIG. 6 comprises a timing diagram showing the operation of a microphone that uses a VAD algorithm and includes power savings features according to various embodiments of the present invention.

Referring now FIG. 6, a timing diagram showing the operation of a microphone that uses a VAD algorithm and includes power savings features is described. The signals of FIG. 6 show how the system and in particular how the microphone reacts to a voice/event signal and generates an interrupt signal. Subsequent to the interrupt signal, the diagrams show how the host reacts to the interrupt signal by changing its mode and afterwards changing the frequency of the clock signal to change the mode of the microphone.

Signal 602 shows an audio signal. Upon detection of an audio signal, the microphone generates an interrupt as shown by signal 604. Data is also generated by the microphone as shown by signal 606. As can be seen by signal 608, the host in response to the interrupt changes the clock signal (sent to the microphone) from a low frequency signal to a high frequency signal. Alternatively (as shown by signal 610), in low power mode (before the event), the host may not send a clock signal and may only start the high frequency clock signal upon detection of the event.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A microphone, the microphone comprising:
a microelectromechanical system (MEMS) circuit that is configured to convert a voice signal into an electrical signal,
an integrated circuit coupled to the MEMS circuit that is configured to receive the electrical signal;
wherein the integrated circuit and the MEMS circuit receive an external clock signal from an external host, the external clock signal being effective to cause the MEMS circuit and integrated circuit to operate in full system operation mode during a first time period and in a voice activity mode of operation during a second time period, the voice activity mode having a first power consumption and the full system operation mode having a second power consumption, the first power consumption being less than the second power consumption, wherein the integrated circuit is configured to generate an electrical interrupt signal upon a detection of voice activity, and send the electrical interrupt signal to the host, and wherein absence of the external clock signal causes the microphone to enter a voice activity detection mode;
wherein the integrated circuit includes a delay buffer that is configured to buffer data included in the electrical signal in order to provide a time delay latency for the integrated circuit to perform sending the electrical interrupt signal, collect noise statistics, or recognize a key phrase in the voice signal;
and the integrated circuit includes an on-chip oscillator disposed at the integrated circuit such that the on-chip oscillator is selectively used by the integrated circuit at least some of the time in place of the external clock signal in order to save power.

2. The microphone of claim 1, wherein host comprises a circuit in a mobile handset, tablet, or personal computer.

3. The microphone of claim 1, wherein the integrated circuit is an application specific integrated circuit (ASIC).

4. The microphone of claim 1, wherein the voice signal comprises a keyword, phrase, or sentence.

5. The microphone of claim 1, wherein the MEMS circuit and the integrated circuit operate in a sleep mode during a third time period.

6. The microphone of claim 1 wherein upon wake-up, buffered data is transmitted over a first transmission line and real time data is transmitted simultaneously over a second and separate output lines.

7. The microphone of claim 1 wherein buffered data is flushed or discarded upon switching modes.

8. The microphone of claim 1, wherein the microphone is over-clocked to catch up buffered data to real time data.

9. The microphone of claim 1 wherein the microphone wake ups and enables data synchronizations of a second microphone either in a buffered or a real time mode.

10. A system for converting voice signals into electrical signals, the system comprising:
an external host;
a microphone, the microphone comprising:
a microelectromechanical system (MEMS) circuit that is configured to convert a voice signal into an electrical signal,
an integrated circuit coupled to the MEMS circuit that is configured to receive the electrical signal;
wherein the integrated circuit and the MEMS circuit receive an external clock signal from the external host, the external clock signal being effective to cause the MEMS circuit and integrated circuit to operate in full system operation mode during a first time period and in a voice activity mode of operation during a second time period, the voice activity mode having a first power consumption and the full system operation mode having a second power consumption, the first power consumption being less than the second power consumption, wherein the integrated circuit is configured to generate an electrical interrupt signal upon a detection of voice activity, and send the electrical interrupt signal to the host, wherein absence of the external clock signal causes the microphone to enter a voice activity detection mode;
wherein the integrated circuit includes a delay buffer that is configured to buffer data included in the electrical signal in order to provide a time delay latency for the integrated circuit to perform sending the electrical interrupt signal, collect noise statistics, or recognize a key phrase in the voice signal;
and wherein the integrated circuit includes an on-chip oscillator disposed at the integrated circuit such that the on-chip oscillator is selectively used by the integrated circuit at least some of the time in place of the external clock signal in order to save power.

11. The system of claim 10, wherein host comprises a circuit in a mobile handset, tablet, or personal computer.

12. The system of claim 10, wherein the integrated circuit is an application specific integrated circuit (ASIC).

13. The system of claim 10, wherein the voice signal comprises a keyword, phrase, or sentence.

14. The system of claim 10, wherein the MEMS circuit and the integrated circuit operate in a sleep mode during a third time period.

15. A method of operating a microphone, the microphone comprising a microelectromechanical system (MEMS) circuit that is configured to convert a voice signal into an electrical signal and an integrated circuit coupled to the MEMS circuit that is configured to receive the electrical signal, the method comprising:
receiving an external clock signal from the external host at the integrated circuit and the MEMS circuit, the external clock signal being effective to cause the MEMS circuit and integrated circuit to operate at a first time in full system operation mode and at a second time in a voice activity mode of operation,
operating in the voice activity mode with a first power consumption during a first time period and operating in the full system operation mode with a second power consumption during a second time period, the first power consumption being less than the second power consumption;
generating an electrical interrupt signal by the integrated circuit upon a detection of voice activity, and sending the electrical interrupt signal to the host;
wherein absence of the external clock signal causes the microphone to enter a voice activity detection mode;
wherein the integrated circuit includes a delay buffer that is configured to buffer data included in the electrical signal in order to provide a time delay latency for the integrated circuit to perform sending the electrical interrupt signal, collect noise statistics, or recognize a key phrase in the voice signal;
and wherein the integrated circuit includes an on-chip oscillator disposed at the integrated circuit such that the on-chip oscillator is selectively used by the integrated circuit at least some of the time in place of the external clock signal in order to save power.

16. The method of claim 15, wherein host comprises a circuit in a mobile handset, tablet, or personal computer.

17. The method of claim 15, wherein the integrated circuit is an application specific integrated circuit (ASIC).

18. The method of claim 15, wherein the voice signal comprises a keyword, phrase, or sentence.

19. The method of claim 15, wherein the MEMS circuit and the integrated circuit operate in a sleep mode during a third time period.

\* \* \* \* \*